Feb. 26, 1957 C. O. GUSTAFSON 2,782,992
HUMIDIFIER SYSTEM
Filed Oct. 9, 1953
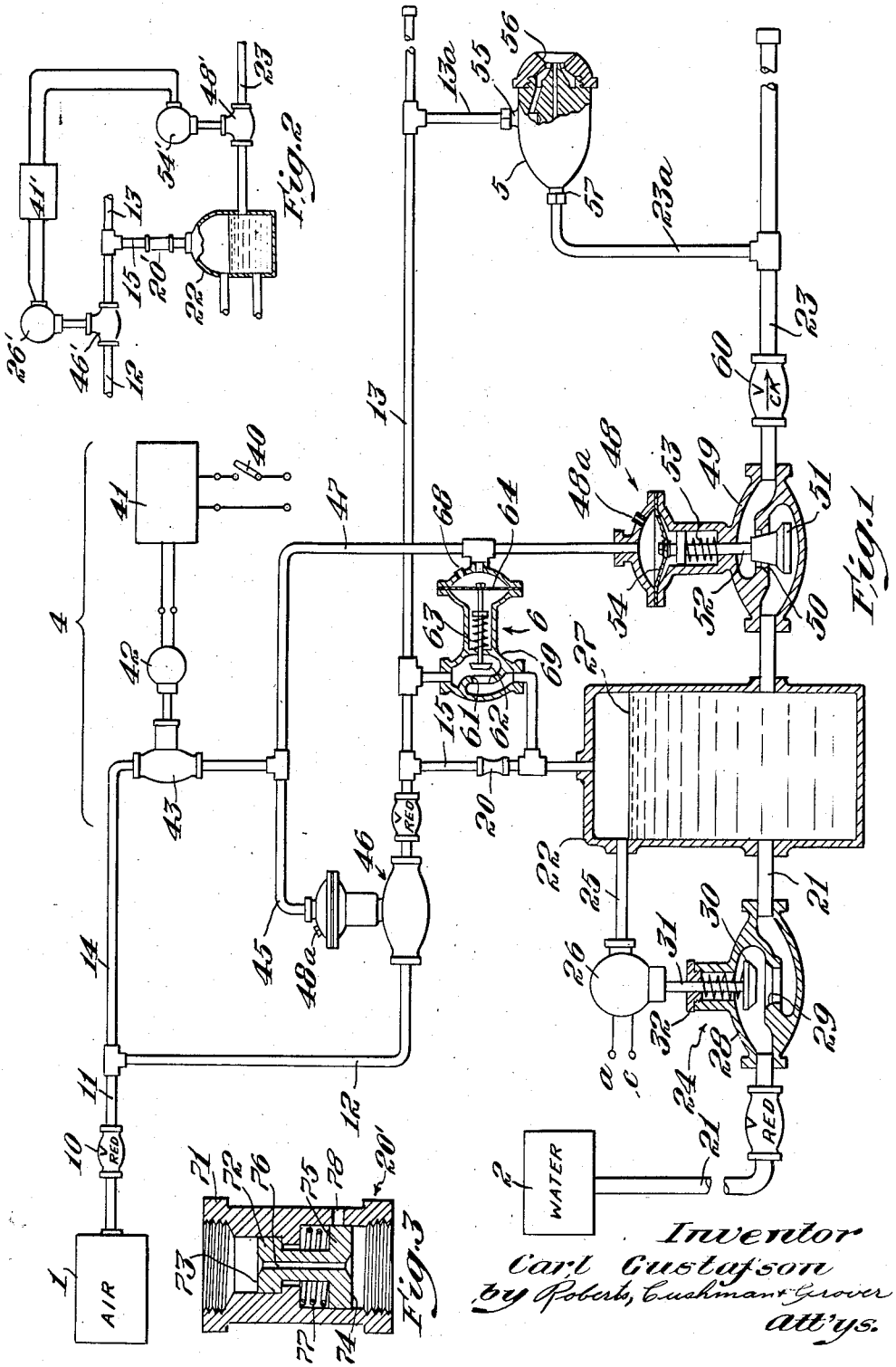
Inventor
Carl Gustafson
by Roberts, Cushman & Grover
att'ys.

United States Patent Office 2,782,992
Patented Feb. 26, 1957

2,782,992
HUMIDIFIER SYSTEM

Carl O. Gustafson, Lunenburg, Mass., assignor to Grinnell Corporation, Providence, R. I., a corporation of Delaware Application October 9, 1953, Serial No. 385,167

6 Claims. (Cl. 236—44)

This invention relates to a humidifier system and particularly to a system responding to conditions of humidity so as to control the flow of air and water to atomizer heads or nozzles in which the air and water are mixed and emitted as a fine mist. With such systems it is necessary to maintain a relation between the supply of water and air to the nozzles to insure proper mist formation. It is also desirable that the air not be cut off, either through failure or by control, until after the water is cut off, so that water is always broken up by the air and emitted as a mist and not allowed to spray out in a stream. While humidistatically controlled systems have been devised they have either failed to maintain proper air and water balance and guard against air pressure failures, or have involved controls so complicated as to be unreliable.

One object of the present invention therefore is to provide a reliable humidifier system which greatly simplifies the control of air and water to the atomizer heads. Another object is to provide safeguards against premature failure of the air supplied to the nozzles, and to maintain the proper balance of air and water.

In one aspect the humidifier system includes one or more atomizer nozzles having air and water inlets, an air line supplying each inlet, a valve controlling air flow or pressure in the line, a humidistat or like humidity responsive actuator for operating the valve, a confined reservoir of water, a water supply line from the reservoir to each water inlet, and a connection between the aforesaid air line and the reservoir for applying pressure to the reservoir to force water to the nozzles, whereby the pressure of water at the nozzles is maintained in a predetermined relation to the pressure of air, the aforesaid connection including pressure step-down means such as a control valve which insures that air applied to the nozzles is at a higher pressure than that applied to the reservoir. Further means may be provided so that in the event of reduction of pressure in the air line pressure in the reservoir is reduced, whereby excess water cannot flow from the nozzle in the absence of air.

In a further aspect the humidifier system comprises an atomizer or mist-forming nozzle having an air inlet and a water inlet, sources of air and water under pressure, an air supply line connected between the air source and the air inlet to the nozzle and a water supply line connected from the water source to the water inlet of the nozzle, normally closed air-actuated control means such as valves in said supply lines respectively, and a common humidity-responsive actuator for controlling air from the air source to the respective air-actuated control means, whereby failure of the air source will cause both of said air-actuated control means to close the water supply line as well as the air supply line and thus prevent water from entering the nozzle unless air is also admitted to form said water into mist.

For the purpose of illustration a typical embodiment of the invention is shown in the accompanying drawing in which Figs. 1 and 2 are schematic diagrams of two embodiments of the humidifier system; and Fig. 3 is a sectional view showing a detail of the system in Fig. 2.

As shown in Fig. 1 the system includes a source of air under pressure such as a compressor 1, a supply of water under pressure 2, a humidity responsive air control valve 4 and an atomizer head or nozzle 5 having an air inlet 55, a water inlet 57 and a mist-forming air and water outlet 56. Air nozzles suitable for use with the present humidifier system are described in greater detail in my U. S. Patents Nos. 2,623,782 and 2,623,783. Air is supplied from the source 1 to the air inlet 55 of the nozzle through lines 11, 12 and 13, and branch line 13a, and to a compression tank or reservoir 22 through a branch line 15. Water is supplied from the supply 2 through line 21, the reservoir 22, and line 23 and branch line 23a to the water inlet 57 of the nozzle. It will be understood that the nozzle 5 is representative of a plurality of nozzles which may be connected to the air and water lines 13 and 23 respectively through other branch lines 13a and 23a.

Water from the source 2 enters tank 22 through a valve 24 controlled by an electromagnetic device 26 to which electrical power is supplied through terminals *a* and *c*. The device 26 reacts to the rise of the water level 27 in the tank 22 above a connecting pipe 25 so as to maintain the water at a constant level. The valve 24 comprises a casing 28 having a valve seat 29. A valve head 30 carried on a stem 31 is normally urged to closed position by a spring 32. The stem 31 is lifted by the electromagnetic device 26 when the water level 27 drops below the level of the pipe 25 to restore the level of water in the tank 27.

Although the pressure of water entering the reservoir 22 from the water inlet valve 28 should be higher than the pressure of air supplied through air lines 11, 12 and branch line 15, the valve 28 operates intermittently only and the pressure on the water in reservoir 22 is dependent directly on the presure of air supplied through line 15. Thus, as the air pressure in the air supply line 13 is varied the pressure of water in the reservoir or tank 22 will be varied accordingly. A restriction plug 20 in the branch line 15 restricts air flow through line 15, thereby tending to maintain higher pressure in air line 13.

The humidistatic controller 4 includes a humidistat 41 which electrically controls an electromagnetic device 42 associated with an air control valve 43. Electrical power supplied from the terminals *a* and *c* through a power switch 40 is varied by the humidistat 41 according to changes in humidity and applied to the electromagnetic device 42 which controls the air valve 43 accordingly. The device 42 and valve 43 are similar in structure to device 26 and valve 24 described above. Air from the source 1 is supplied to the valve 43 through lines 11 and 14, and from the valve 43 through line 45 to an air-actuated air control valve 46, and through line 47 to a similar air-actuated water control or outlet valve 48 and a normally open by-pass valve 6. Valve 46 controls the supply of air through the air supply lines 11, 12 and 13 while outlet valve 48 controls the flow of water from the tank 22 through the water supply line 23. Each of valves 46 and 48 comprises a body 49 enclosing a valve seat 50 closed by a valve head 51. The head 51 is carried on a stem 52 which normally holds the head 51 seated under the influence of a spring 53. At its upper end the stem 52 is connected to a diaphragm 54 which reacts to increased air pressure in the line 47 to open the valve head 51. A bleeder opening 48a relieves pressure from the diaphragm 54 when the electromagnetic device 42 partially or wholly closes the valve 43.

The by-pass valve 6 has a body 69 enclosing a valve seat 61 closed by a valve head 62. A spring 63 normally holds the valve head 62 open thereby by-passing the restriction plug 20. The valve is closed when air is supplied through line 47 to a diaphragm 64. A bleeder opening 68 permits quick opening of the valve when pressure is removed from line 47.

With air and water supplied to lines 11 and 21 respectively, the humidifier system is put in operation by closing the humidistat power switch 40. If the humidistat 41 detects an insufficient degree of humidity it will cause the device 42 to open the control valve 43. Air valve 43 then actuates valves 46, 48 and 6 opening the air and water lines and closing the by-pass valve respectively. When the air supply valve 46 opens air is supplied to the atomizer nozzle 5 and also to the reservoir 22. When sufficient pressure is built up in the reservoir water will be forced to the nozzle and on arrival will be atomized by air already flowing through the nozzle. The restriction valve 20 delays the build-up of pressure in the reservoir thereby assuring that an adequate supply of air reaches the nozzle through the air line 13 before water arrives through line 23.

The present humidifier system is adapted for either continuous or intermittent operation. For continuous operation the humidistat varies the pressure to the diaphragm 54 of the control valve 46 so that this valve opens more or less and permits more or less air and water to be supplied to the spray nozzle 5. For intermittent operation a humidistat either fully opens or fully closes the valve 43, and the control valves 46 and 48 are provided with springs 53 of less strength so that the valve heads 51 are held either in full open or full closed position.

If the power switch 40 is open, de-energizing the electromagnetic device 42 the valve 43 returns to its closed position, the bleeder openings 48a bleed air from the diaphragms 54 of the air-actuated valves 46 and 48. The step-down valve 20 in the branch air line 15 tends to maintain higher pressure in the reservoir 22 than in the air line 13. However, when the control valve closes relieving pressure from line 47, the by-pass valve 6 opens and immediately equalizes the pressure in the air line and reservoir. The supply of air continues substantially undiminished for a short time so that the residual water is atomized and not permitted to dribble or squirt from the atomizer opening 57. A check valve 60 prevents reverse flow of water from the spray nozzle thereby insuring quick delivery of water to the nozzle when the system is started again.

Should the supply of air fail during the operation of the humidifier system, the humidistat valve 43 will be unaffected but as pressure on diaphragm 64 of valve 6 is reduced by the bleeding of air through the opening 63 thereby opening valve 6 pressure in the air line 13 will be equalized relative to the reservoir 22 so that air continues to be supplied to the nozzle 5 until all residual pressure has been relieved from the water supply line 23.

In the modified system shown in Fig. 2 the air control valve 46' for air line 13 and the water control valve 48' for water line 23 are electrically controlled by a humidistatic actuator 41' which operates control devices 26' and 54' associated with valves 46' and 48' respectively. The water control valve 48', like valve 48 of Fig. 1, is preferably adjusted by device 54' between a fully open position when valve 46' is open and a fully closed position when valve 46' is closed. Valve 46' may be adjusted through various partially open positions according to the humidity conditions sensed by the humidistat 41'. Accordingly the device 26' may be a motor or a spring controlled solenoid for holding the air control valve 46' in various open positions according to the electrical signal transmitted by the humidistat 41', thereby controlling air flow with relation to humidity requirements.

In accordance with the present invention air pressure is transmitted not only through line 13 to the humidifier nozzles but also through branch line 15 to the constant level tank 22 so that the pressure on the water in the tank 22 is proportional to the air pressure in line 13, thereby maintaining a proportional flow of air and water to the nozzles. If desired the proportion of air to water pressure may be maintained at a ratio higher than 1:1 as by a modified restriction and control valve 20' shown in detail in Fig. 3. The control valve 20' comprises a cylindrical casing 71 enclosing a piston 72 having piston faces 73 and 74 of unequal area and an interconnecting restriction passage 76. A light spring 77 normally holds the lower piston head 75 covering a bleeder opening 78. The relatively smaller area of the upper piston face 73 which faces the air line 13 permits a lower pressure in the reservoir applied to the face 74 to lift the valve head 75. For example, with a 1:2 area ratio between the faces 73 and 74, a reservoir pressure one-half that of the air line pressure (plus a small pressure for overcoming the force of the light spring 77) will lift the piston head 75. The piston head 75 normally covering the vertically elongated rectangular bleeder port 78 when lifted by excess reservoir pressure by-passes the restriction passage 76 and permits air to bleed from the reservoir until the desired pressure ratio between the reservoir 22 and air line 13 is restored. The vertical elongation of the opening 78 affords more rapid bleeding in proportion to higher lifting of the head 75 due to large excesses of reservoir pressure.

From the foregoing it will be seen that the supply of water to the spray heads 5 is dependent as to pressure entirely upon the supply of air to the nozzle, and furthermore that variations in the supply of water are controlled by air from the same source which supplies atomizing air to the inlet 55 of the atomizer nozzle. While I have shown as a source of water a constant level tank connected to a supply, it is apparent that other sources which are under pressure or may be subjected to air pressure will be suitable for use with the present invention. Specific valves and atomizer nozzles are shown for the purpose of illustrating my invention but it should be understood that the invention includes all modifications and equivalents which fall within the scope of the appended claims.

I claim:

1. In a humidifier system including an atomizer nozzle having air and water inlets, an air supply line to the air inlet, a confined reservoir of water, a water supply line from said reservoir to said water inlet, the improvement which comprises branch means adapted to connect the air line with the reservoir for applying pressure in the reservoir to force water through the water line, said branch means comprising means reducing the pressure passing therethrough so as to maintain the water pressure below the air pressure regardless of change in the air pressure, said last recited means including a casing, a piston slidably received therein and having a restriction passage therethrough, said piston having opposing faces one of which is adapted to be subjected to air line pressure and the other of which is larger and adapted to be subjected to the pressure of the reservoir, said casing having a bleeder opening normally covered by said piston and uncovered as the air line pressure drops so as to bleed pressure from the reservoir.

2. In a humidifier system including an atomizer nozzle having air and water inlets, an air supply line to the air inlet, a confined reservoir of water, a water supply line from said reservoir to said water inlet, the improvement which comprises branch means adapted to connect the air line with the reservoir for applying pressure in the reservoir to force water through the water line, said branch means comprising means reducing the pressure passing therethrough so as to maintain the water pressure below the air pressure regardless of change in the air pressure, said last recited means including a casing, a piston slidably received therein and having a restriction passage therethrough, said piston having opposing faces one of which is adapted to be subjected to air line pressure and the other of which is larger and adapted to be subjected to the pressure of the reservoir, said casing having a bleeder opening normally covered by said piston and uncovered as the air line pressure drops so as to bleed pressure from the reservoir, said bleeder opening being elongated longitudinally of the casing so that upon movement of said piston in response to a drop in air line pressure more and more of said opening is uncovered, and spring means normally urging said piston to a position covering said bleeder opening.

3. A humidifier system comprising an atomizer nozzle having air and water inlets, an air supply line to the air inlet, a valve controlling air pressure in the line to said inlet, a humidity responsive actuator for operating said valve, a confined reservoir of water, a water supply line from said reservoir to said water inlet, branch connecting means between said air line and said reservoir for applying pressure in said reservoir to force water through said water line, and a pressure controller including restriction means in said branch connecting means reducing pressure applied in said reservoir relative to pressure in said air line, and means by-passing said restriction means to relieve pressure in said reservoir out through said nozzle when pressure in said air line is reduced to an excessive amount so that air continues to be supplied to said nozzle as long as there is pressure in the reservoir.

4. A humidifier system comprising an atomizer nozzle having air and water inlets, an air supply line to the air inlet, a valve controlling air pressure in the line to said inlet, a humidity responsive actuator for operating said valve, a confined reservoir of water, a water supply line from said reservoir to said water inlet, branch connecting means between said air line and said reservoir for applying pressure in said reservoir to force water through said water line, and a pressure controller including restriction means in said branch connecting means reducing pressure applied in said reservoir relative to pressure in said air line, and valve means by-passing said restriction means to relieve pressure in said reservoir out through said nozzle when pressure in said air line is reduced to an excessive amount so that air continues to be supplied to said nozzle as long as there is pressure in the reservoir, said by-pass valve means being a normally open valve with an air actuator connected with the air line so as to close the normally open valve while there is pressure in said air line.

5. A humidifier system comprising an atomizer nozzle having air and water inlets, an air supply line to the air inlet, a normally closed air actuated valve controlling air pressure in the line to said air inlet, a confined reservoir of water, a water supply line from said reservoir to said water inlet, a normally closed air-actuated outlet valve in said water line, a humidity responsive actuator for operating said valves, branch connecting means providing intercommunication of said air line with said reservoir, said branch connecting means being connected with said air line between the valve and nozzle, restriction means in said branch connecting means reducing the pressure applied in said reservoir relative to pressure in said air line, by-pass means for said restriction means interconnecting said reservoir with said air line between said nozzle and the valve in said air line, said by-pass means being closed when there is sufficient pressure in said air line and open when the pressure in said air line drops beyond a predetermined amount so as to cause exhausting of air under pressure in said reservoir out through said air line and said nozzle while water under pressure passes out through said water line and said nozzle.

6. A humidifier system comprising an atomizer nozzle having air and water inlets, an air supply line to the air inlet, a normally closed air actuated valve controlling air pressure in the line to said air inlet, a confined reservoir of water, a water supply line from said reservoir to said water inlet, a normally closed air-actuated outlet valve in said water line, a humidity responsive actuator for operating said valves, branch connecting means providing intercommunication of said air line with said reservoir, said branch connecting means being connected with said air line between the valve and nozzle, restriction means in said branch connecting means reducing the pressure applied in said reservoir relative to pressure in said air line, by-pass means for said restriction means interconnecting said reservoir with said air line between said nozzle and the valve in said air line, said by-pass means being closed when there is sufficient pressure in said air line and open when the pressure in said air line drops beyond a predetermined amount so as to cause exhausting of air under pressure in said reservoir out through said air line and said nozzle while water under pressure passes out through said water line and said nozzle, said by-pass means including a by-pass air line across said restriction means and a normally open air-actuated valve in said by-pass line, said humidity responsive actuator being connected with said by-pass valve and operative to close said by-pass valve upon opening of said valves in said air and water lines.

References Cited in the file of this patent

UNITED STATES PATENTS

| 1,270,159 | Hodge | June 18, 1918 |
| 2,663,500 | Holtzclaw | Dec. 22, 1953 |

OTHER REFERENCES

Behar: "Handbook of Industrial Temperature and Humidity Measurement and Control," first edition, published 1932 by The Instruments Publishing Company, Pittsburgh, Pennsylvania, page 256.